United States Patent
Parker

(10) Patent No.: US 6,895,232 B2
(45) Date of Patent: May 17, 2005

(54) METHOD AND APPARATUS FOR RECEIVING RADIO FREQUENCY SIGNALS

(75) Inventor: Jonathan Parker, Cairns (AU)

(73) Assignee: Conexant Systems, Inc., Newport Beach, CA (US)

( * ) Notice: Subject to any disclaimer, the term of this patent is extended or adjusted under 35 U.S.C. 154(b) by 738 days.

(21) Appl. No.: 09/992,769

(22) Filed: Nov. 6, 2001

(65) Prior Publication Data

US 2002/0081988 A1 Jun. 27, 2002

Related U.S. Application Data

(63) Continuation-in-part of application No. PCT/US00/12298, filed on May 4, 2000.

(30) Foreign Application Priority Data

May 7, 1999 (GB) .............................. 9910662

(51) Int. Cl.[7] .............................. H04B 1/04; H04B 1/26
(52) U.S. Cl. ...................... 455/313; 455/118; 455/311; 455/312
(58) Field of Search ................................ 455/313, 314, 455/323; 375/355, 346; 341/61, 157

(56) References Cited

U.S. PATENT DOCUMENTS

| | | | | |
|---|---|---|---|---|
| 5,557,642 A | * | 9/1996 | Williams | .................... 375/316 |
| 5,630,227 A | | 5/1997 | Bella et al. | .................. 455/324 |
| 6,157,682 A | * | 12/2000 | Oberhammer | ............... 375/316 |
| 6,363,262 B1 | * | 3/2002 | McNicol | ...................... 455/561 |
| 6,424,683 B1 | * | 7/2002 | Schollhorn | .................. 375/332 |
| 6,427,068 B1 | * | 7/2002 | Suominen | ................... 455/302 |

FOREIGN PATENT DOCUMENTS

| | | | | |
|---|---|---|---|---|
| EP | 0696854 A1 | 7/1995 | ............ | H04B/1/26 |
| WO | WO 94/05087 | 3/1994 | ............ | H03M/1/00 |
| WO | WO/96/21280 | 7/1996 | ............ | H03M/1/12 |
| WO | WO 96/39750 | 12/1996 | ............ | H04B/1/26 |
| WO | WO 97/05705 | 2/1997 | ............ | H04B/1/26 |

* cited by examiner

Primary Examiner—Curtis Kuntz
Assistant Examiner—Tuan Pham
(74) Attorney, Agent, or Firm—The Eclipse Group

(57) ABSTRACT

A method and apparatus for receiving radio frequency signals in a communication system is described. The inventive method and apparatus utilizes an inventive receiver circuit that downconverts an input signal so that interference components of the input signal can be easily removed at baseband. Specifically, the inventive receiver circuit operates by sub-sampling a first intermediate frequency signal in such a way that an unwanted signal is not aliased into a wanted signal, and can therefore be filtered therefrom after sub-sampling. Thus, the present invention allows the use of a relatively simple tuner, with a single downconversion stage, without imposing excessive requirements on the filtering in the tuner.

33 Claims, 3 Drawing Sheets

METHOD AND APPARATUS FOR RECEIVING RADIO FREQUENCY SIGNALS

CROSS-REFERENCE TO RELATED APPLICATION

This application is a continuation-in-part of PCT International Application No. PCT/US00/12298, entitled "Receiver Circuit", filed on May 4, 2000, published under PCT Article 21(2) in English, which PCT application claims priority to Great Britain Application Number 9910662.7, entitled "Pass-Band Signal Processing" filed on May 7, 1999. This application therefore claims priority under 35 U.S.C. §§120 and 363 to the PCT Application No.: PCT/US00/12298 filed May 4, 2000.

BACKGROUND

1. Field

This invention relates to receiving method and apparatus, and more particularly to a method and apparatus for receiving radio frequency signals.

2. Description of Related Art

Conventional radio receiver circuits in which a received analog signal is downconverted in a first mixer stage to a first intermediate frequency, and subsequently downconverted in a second mixer stage to a second intermediate frequency are well known. It is also well known to sample the analog signal at the second intermediate frequency using an analog-to-digital converter.

Also well known are techniques of digital sub-sampling, whereby an analog-to-digital converter is used to achieve downconversion of a signal. These techniques rely upon the well-known phenomenon of signal "aliasing". An analog-to-digital converter having a sampling rate (or sample frequency) of F can only entirely reliably reproduce signals having a frequency below (i.e., less than) F/2. Higher frequency signals are still detected, but these signals appear in the output digital signal at frequencies ranging from 0 to F/2. Thus, analog input signals having frequencies of f, (F−f), (F+f), (2F−f), (2F+f), etc. appear in an output signal at the frequency f.

The prior art digital sub-sampling techniques are utilized in a well-known manner to achieve downconversion of radio frequency signals. For example, one such prior art system is taught by Bella et al., in U.S. Pat. No. 5,630,227, issued on May 13, 1997. In particular, digital sub-sampling techniques can be used to downconvert a signal that only has components over a relatively narrow range of frequencies. For example, if an analog signal has frequency components only at one or more frequencies (designated (3F+f)) within a range from 3F to 3.5 F, and is sampled by an analog digital converter at a sampling frequency F, the output digital signal will have corresponding components at the frequency or frequencies f in the range from 0 to 0.5F. In other words, the frequency range from 3F to 3.5F is said to be "aliased" to a range from 0 to 0.5F.

Disadvantageously, the above-described well-known system is unable to effectively combat the detrimental effects of adjacent channel interference. Specifically, when a signal has a frequency that is relatively close to a frequency of one of the desired signals in the input, the above-described known system causes this signal to produce an output that interferes with the desired output signals in an unpredictable manner. In other words, the interferer (i.e., the signal that has a frequency that is relatively close to a frequency of one of the desired input signals) may alias to a frequency close to that at which a desired output signal will appear, and moreover may be a stronger signal than the desired signal, such that it cannot easily be removed through filtering.

Therefore, a need exists for a method and apparatus for receiving radio frequency signals in a communication system that can be easily implemented and overcomes the disadvantages of other methods and apparatuses such as the above-described known systems. The present disclosure provides such a radio frequency receiver method and apparatus.

SUMMARY

This disclosure describes a method and apparatus for receiving radio frequency signals. The present method and apparatus counteracts aliasing problems associated with the prior art techniques by determining a relationship between the center frequency of an analog-to-digital converter input signal, a frequency of an undesired or unwanted signal, and the sampling rate of the analog-to-digital converter.

In one embodiment a radio receiver circuit is described, wherein the radio receiver circuit receives an input signal in a received signal band, including a desired or wanted signal in a first desired, or wanted frequency band between a lower wanted frequency and an upper wanted frequency, the wanted signal being centered at a first wanted frequency band center frequency, and the input signal further including an interference signal at an interference frequency within the received signal band. The receiver circuit comprises an analog-to-digital converter having a sampling frequency that is less than twice the upper wanted frequency for downconverting the input signal. The sampling frequency is selected such that the degree of aliasing of the interference signal into the first wanted frequency band after downconversion is kept below a predetermined threshold.

In a second embodiment, a method of receiving an input radio signal in a received signal band is described. In this embodiment, the input signal includes a desired or a wanted signal in a first wanted frequency band between a lower wanted frequency and an upper wanted frequency. The desired or wanted signal is centered at a first wanted frequency band center frequency, and further includes an interference signal at an interference frequency within the received signal band. The method includes the step of downconverting the input signal by sampling the input signal at a sampling frequency that is less than twice the upper wanted frequency. The sampling frequency is selected such that the degree of aliasing of the interference signal into the first wanted frequency band after downconversion is maintained below a predetermined threshold.

Thus, the sampling frequency is chosen relative to the first wanted frequency band center frequency, which advantageously is a first intermediate frequency after initial downconversion of the input signal, such that the interference signal is maintained after subsampling, allowing the interference signal to be removed at baseband.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations to the present invention.

The disclosed devices and methods are methods and apparatus for receiving radio frequency signals in communication systems. The present inventive method and apparatus utilizes an inventive receiver circuit that downconverts input signals so that interference components of the input signals can be easily removed at baseband. The present inventive method and apparatus is now described in detail with reference to FIG. 1.

Figure 1:
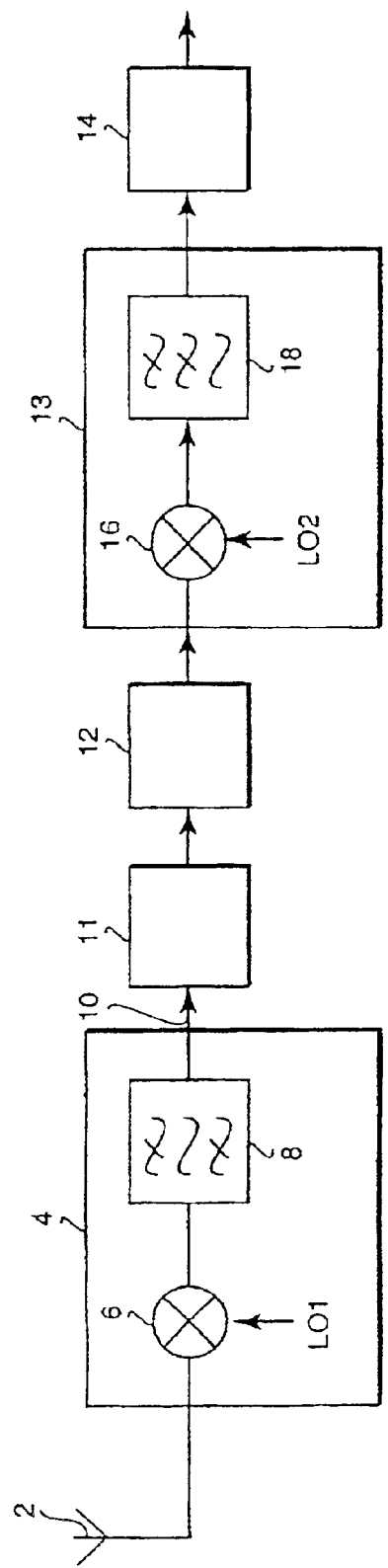
FIG. 1 is a simplified block diagram of a receiver circuit in accordance with one embodiment of the invention.

FIG. 1 shows a receiver circuit made in accordance with the present invention. The invention is described herein with reference to its application in the reception of digital terrestrial television (DTT) signals using the European DVB-T standard based on Coded Orthogonal Frequency Division Multiplexing (COFDM). However, those skilled in the receiver arts shall appreciate that the present invention's use is independent of the type of signals being received. The present invention can be used to receive signals in virtually any type of radio frequency communication system.

FIG. 1 shows an antenna 2, for receiving broadcast UHF/VHF signals, containing video data modulated using Coded Orthogonal Frequency Division Multiplexing (COFDM). The broadcast signals are supplied to an analog tuner 4 as shown in FIG. 1. The tuner 4 includes a mixer 6 which receives a first local oscillator signal LO1 used for the downconversion of the received signals to a first intermediate frequency, and a band-pass filter 8, which may, for example, be formed from a pair of SAW filters. The filter 8 is assumed to attenuate all signals outside of a channel of width CW, at least to a level at which they cannot interfere with desired or wanted received signals. A conventional downconversion process will typically invert the frequency sense of the received signal spectrum.

The output signal that is produced by the analog tuner 4, at an output 10, is therefore at a first intermediate frequency "IF1". The IF1 signal is applied to an automatic gain control circuit 11, and then to an analog-to-digital converter 12. The analog-to-digital converter has a sampling rate SR which is less than twice the first intermediate frequency IF1, and therefore sub-samples the signal. This sub-sampling effectively downconverts the signal by aliasing to a second intermediate frequency, "IF2" which is relatively close to baseband. The analog-to-digital converter 12 should therefore be designed to have an adequate response to signals at the first intermediate frequency IF1. The automatic gain control circuit 11 is capable of maintaining the signal level of the first intermediate frequency IF1 so that the analog-digital converter 12 can accurately sample the IF1 signal.

The baseband output from the analog-to-digital converter 12 is supplied to a filtering device 13, and then to a demodulator 14 in the form of digitized samples of the input signals. The filtering device 13 includes a mixer 16, which receives a second local oscillator signal "LO2". The second local oscillator signal LO2 is at the second intermediate frequency "IF2". The output from the mixer 16 is input to a low-pass filter 18, for removal of undesired or unwanted components. The demodulator 14 removes the COFDM modulation, and supplies output signals that can be converted into a form that is suitable for display.

Although FIG. 1 shows several discrete blocks, it will be appreciated by those skilled in the electronics design arts that the different stages may be integrated as much as is desirable, for example onto a single chip, or other arrangements of functions can be used. For example, the analog tuner 4 may comprise one component, while the analog-to-digital converter 12, demodulator 14, and subsequent processing circuitry may be combined.

Figure 2:
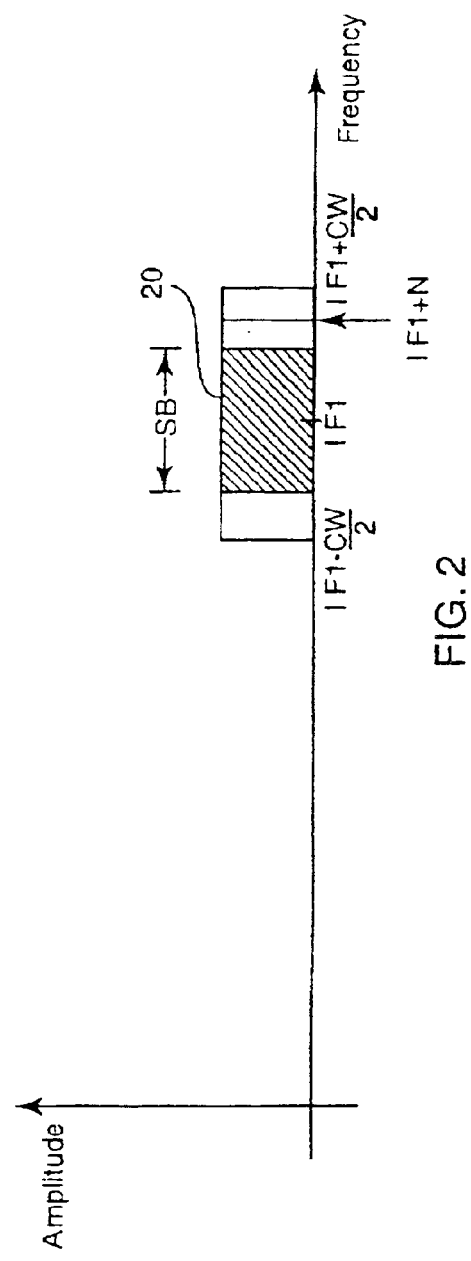
FIG. 2 is a first exemplary graphic representation showing the aliasing of received signals in the embodiment shown in FIG. 1.

FIG. 2 shows a first exemplary graphic representation of a signal present at the output 10 of the tuner 4. As shown in FIG. 2, the downconverted signal is centered at the first intermediate frequency IF1, as described above. The band-pass filter 8 has a channel width CW centered at IF1, thus signals in the range (IF1−CW*½) to (IF1+CW*½) appear at the output 10. The shaded area 20 represents the signal bandwidth SB, which contains desired or "wanted" COFDM signals.

However, because the channel width CW is sufficiently wide to pass not only the desired signal bandwidth SB, it is also sufficiently wide to pass any adjacent, potentially interfering undesired signal. For example, the unwanted signal may appear at (IF1+N). For example, in the United Kingdom, a NICAM (Near Instantaneous Companding Audio Multiplex) sound signal may appear at this point. Moreover, the NICAM signal may be strong (for example +10 dB) relative to the desired or wanted COFDM signals.

In principle, it would be possible to design the band-pass filter 8 such that this unwanted signal is filtered out at that point. However, the gap between the edge of the wanted signal bandwidth and the adjacent unwanted signal is relatively narrow, at least compared to the intermediate frequency IF1, and so it is relatively difficult to achieve this filtering at the intermediate frequency. It is preferable to be able to filter out this unwanted signal at baseband, but, in order to be able to do this, it is necessary to avoid a situation where the unwanted signal appears within the wanted signal in the downconverted signal as a result of aliasing.

The present invention relates to a method and apparatus that removes unwanted signals from wanted signals in the downconverted signal. Consequently, a tuner can be designed having a single downconversion stage, without placing excessive demands on the filter or filters in the tuner. Moreover, one aspect of the present invention involves maintaining the interfering signal unaffected, right until it is removed. Thus, the analog-to-digital converter 12 must have sufficient headroom, that is, enough effective bits, to be able to accurately represent both the interfering signal and the wanted signal. Further, the automatic gain control circuit 11 scales the tuner output so that it fits optimally into the available range of the analog-to-digital converter.

Figure 3:
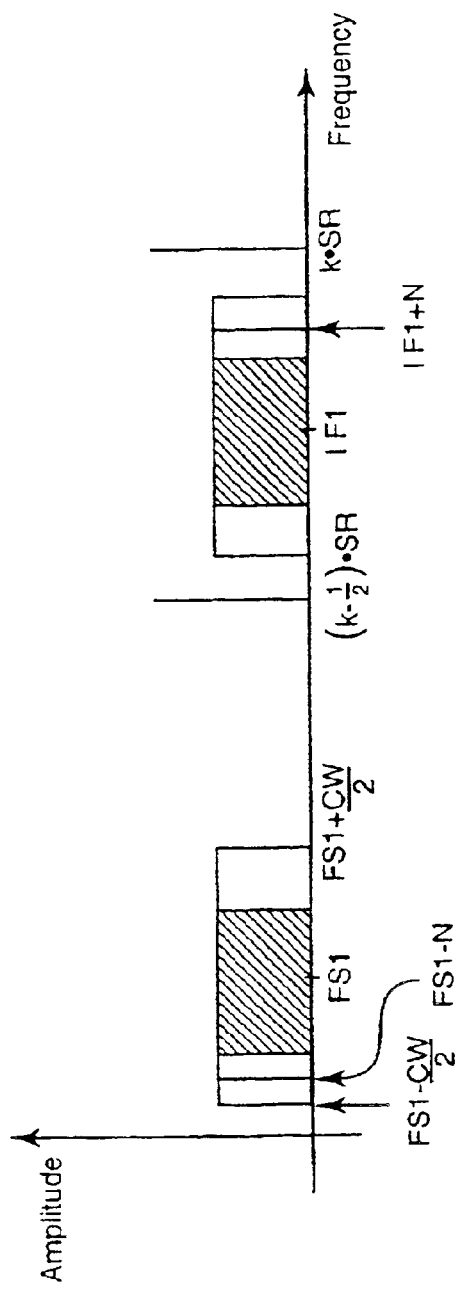
FIG. 3 is a second exemplary graphic representation showing the aliasing of received signals in the embodiment shown in FIG. 1.

FIG. 3 shows a possible situation after sub-sampling, at the output of the analog-to-digital converter 12. In this case, the sampling rate SR has been chosen such that the whole of the tuner pass-band from (IF1−CW*½) to (IF1+CW*½) appears within the frequency range from (k−½)*SR to k*SR, where k is an integer. After sub-sampling, the entire tuner pass-band appears, inverted, in the frequency range from 0 to ½*SR. In particular, if the center frequency of the pass-band, the intermediate frequency IF1, is separated from the relevant multiple of the sampling frequency k*SR by a frequency separation FS1, where FS1 equals ((k*SR)−IF1), then the center frequency of the downconverted signal appears at FS1, which is, in effect, a second intermediate frequency at close to baseband.

If the first downconversion stage inverts the frequency sense of the spectrum, this re-inversion is desirable. However, this inversion can later be removed if necessary, by inverting the sign of all Q values in the I and Q digital samples.

As shown in FIG. 3, the pass-band from (IF1−CW*½) to (IF1+CW*½) aliases to the range from (FS1−CW*½) to (FS1+CW*½), while the potentially interfering unwanted signal aliases from (IF1+N) to (FS1−N). Because the unwanted signal remains outside the signal band SB, which is now centered on FS1, it can relatively easily be filtered out in the demodulator 14 before the signal is processed further. Specifically, the signal is preferably mixed in a mixer 16 with a complex carrier at FS1. The unwanted signal, which is further removed from FS1 than is the wanted signal, is mixed to a higher frequency, and can be removed by a low-pass filter 18, to an extent sufficient to avoid affecting further processes. If necessary, a second automatic gain control circuit (not shown) can be used to boost the signal to an appropriate level.

Figure 4:
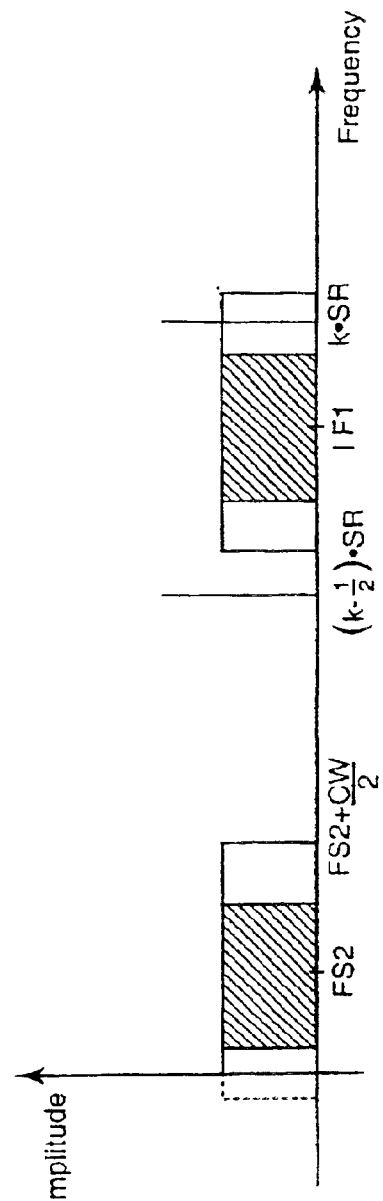
FIG. 4 is a third exemplary graphic representation showing the aliasing of received signals in the embodiment shown in FIG. 1.

FIG. 4 shows an alternative possible situation after sub-sampling, at the output of the analog-to-digital converter 12. In this case, the sampling rate SR has been chosen such that k*SR, where k is an integer, falls within the tuner pass-band from (IF1−CW*½) to (IF1+CW*½). After sub-sampling, that part of the tuner pass-band from (IF1−CW*½) to k*SR appears, inverted, in the frequency range from 0 to ½*SR. Further, however, that part of the tuner pass-band from k*SR to (IF1+CW*½) also appears, uninverted, in the frequency range from 0 to ½*SR.

In effect, the aliasing means that the upper end of the tuner pass-band seems to reflect about the zero frequency point in the downconverted signal. In this case, if the center frequency of the pass-band, the intermediate frequency IF1, is separated from the relevant multiple of the sampling frequency k*SR by a frequency separation FS2 (where FS2 equals ((k*SR)−IF1)) then the center frequency of the downconverted signal appears at FS2.

As described above, the part of the pass-band from (IF1−CW*½) to k*SR aliases to the range from 0 to (FS2+CW*½), while the part of the pass-band from k*SR to (IF1+CW*½) aliases from 0 to (IF1+CW*½k*SR), or, said in other words, from 0 to (½*CW−FS2). There should be no aliasing of the COFDM wanted signal into itself. That is, in FIG. 4, the upper end of the wanted signal, at (IF1+SB*½) aliases to (FS2−SB*½), and it is therefore necessary that (FS2−SB*½)>0. Further, and in particular, the potentially interfering unwanted signal at (IF1+N) aliases to (FS2−N), if FS2>N. The potentially interfering unwanted signal at (IF1+N) aliases to (N−FS2), if N>FS2.

In order to allow the unwanted signal to be filtered out in the demodulator 14, it should remain outside of the signal band SB, which is now centered on FS2. Moreover, the unwanted signal should be sufficiently far outside the signal band to be filtered therefrom, even allowing for any frequency offset that may be present.

If FS2>N, then because N>SB*½ (because the unwanted signal is known to appear outside the wanted signal band in the signal at the first intermediate frequency), the unwanted signal will be aliased outside of the wanted signal band. However, if N>FS2, it is possible that the unwanted signal will be aliased into the wanted signal band. In order to avoid this, it is therefore desirable that the method adheres to the following condition:

$$(N-FS2)+\Delta<(FS2-SB*\tfrac{1}{2});$$

where Δ is the allowed frequency offset, or reflects the fact that the unwanted signal at (IF1+N) may have a finite bandwidth and be centered at that frequency.

Conversely, if the sampling rate SR is chosen such that (k−½)*SR falls within the pass-band, the part of the pass-band from (IF1−CW*½) to (k−½)*SR aliases to the range from 0 to ½*SR without frequency inversion, while the part of the pass-band from (k−½)*SR to (IF1+CW*½) also aliases into the range from 0 to ½*SR, with frequency inversion. In effect, this aliasing means that the lower end of the tuner pass-band seems to reflect about the ½*SR frequency point in the downconverted signal.

Figure 5:
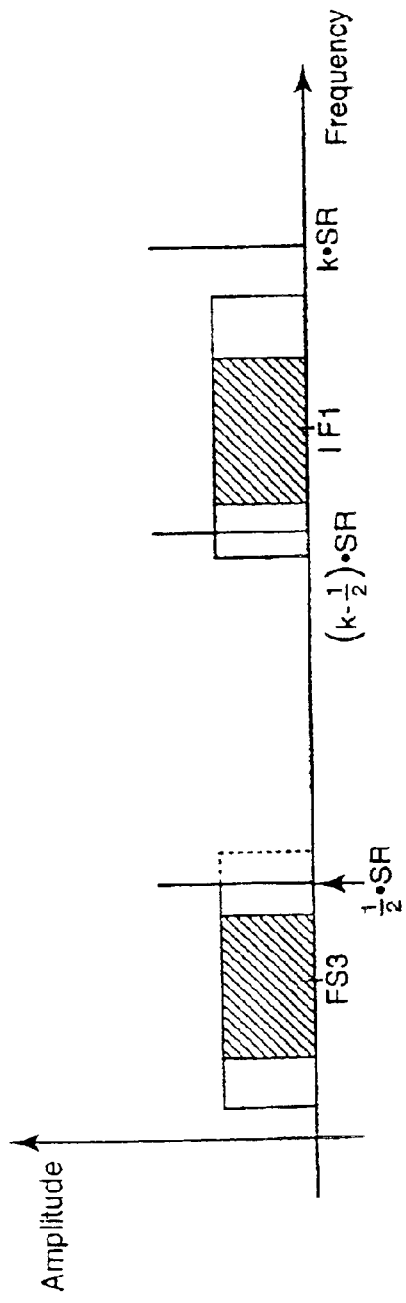
FIG. 5 is a fourth exemplary graphic representation showing the aliasing of received signals in the embodiment shown in FIG. 1.

FIG. 5 shows this reflection about the ½*SR frequency point in the downconverted signal. In this case, if the center frequency of the pass-band, the intermediate frequency IF1, is separated from the relevant multiple of the sampling frequency k*SR by a frequency separation FS3, where FS3 equals (k*SR−IF1), then the center frequency of the downconverted signal appears at FS3.

As mentioned above, the part of the pass-band from (IF1−CW*½) to (k−½)*SR aliases to the range from 0 to ½*SR, while the part of the pass-band from (k−½)*SR to (IF1+CW*½) aliases from (FS3−CW*½) to ½*SR. There should be no aliasing of the COFDM wanted signal into itself. That is, as shown in FIG. 5, the lower end of the wanted signal, at (IF1−SB*½) aliases to (FS3+SB*½), and it is therefore desirable that the method adheres to the following condition:

$$(FS3+SB*\tfrac{1}{2})+\Delta<\tfrac{1}{2}*SR;$$

where Δ again is a possible offset.

However, in this case, the potentially interfering unwanted signal at (IF1+N) aliases to (FS3−N), and cannot alias into the wanted signal.

Figure 6:
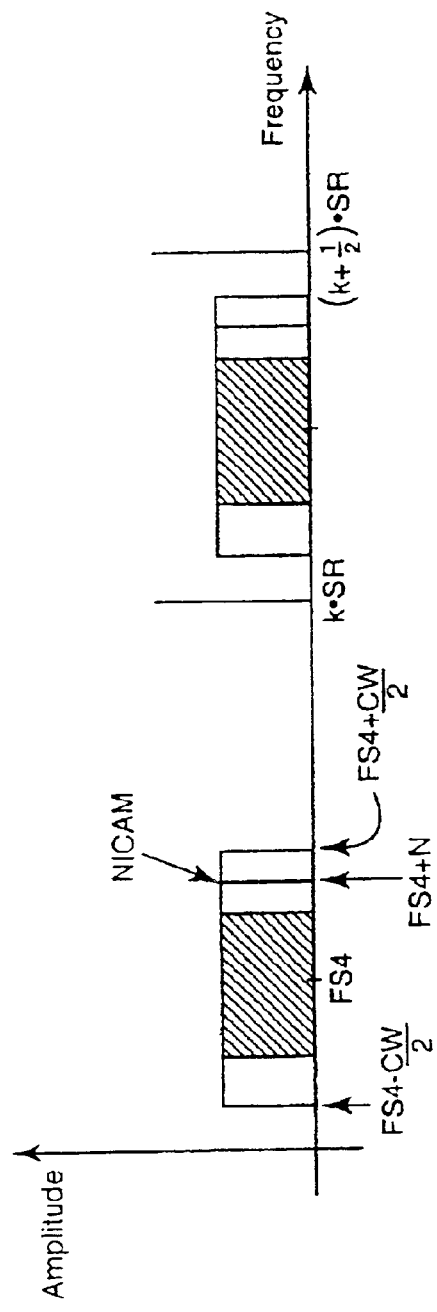
FIG. 6 is a fifth exemplary graphic representation showing the aliasing of received signals in the embodiment shown in FIG. 1.

FIG. 6 illustrates a further alternative to that shown in FIG. 3. Here, the sampling rate SR has been chosen such that the whole of the tuner pass-band appears within the frequency range from k*SR to (k+½)*SR, where k is an integer. After sub-sampling, the whole tuner pass-band appears, non-inverted in this case, in the frequency range from 0 to ½*SR, with center frequency FS4, where FS4 equals (IF1−k*SR).

As in the example of FIG. 3, the unwanted NICAM signal remains outside the signal band centered on FS4 after this downconversion, and can be filtered out in the demodulator 14. FIG. 3 shows the sampling rate SR chosen such that the whole of the tuner pass-band appears within the frequency range from (k−½)*SR to k*SR. FIG. 6 shows the sampling rate SR chosen such that the whole of the tuner pass-band appears within the frequency range from k*SR to (k+½) *SR. FIGS. 4 and 5 show the sampling rate SR chosen such that the tuner pass-band appears largely (but not entirely) within the frequency range from (k−½)*SR to k*SR. However, it is also possible to choose the sampling rate such that the tuner pass-band appears largely but not entirely within the frequency range from k*SR to (k+½)*SR, with the same constraints.

To facilitate a better understanding of the present invention, the above-described cases will now be illustrated for the case of a received COFDM signal, which has been downconverted in a first stage to a first intermediate frequency of 36.167 MHz, with a pass-bandwidth of 9.40 MHz. The actual wanted signal bandwidth is 7.61 MHz, centered at the intermediate frequency of 36.167 MHz. The nearest adjacent interference signal is a NICAM signal at (36.167+4.1981)=40.3651 MHz.

Choosing a sampling rate, SR, of 20.5 Mega samples per second (Ms/s) means that the whole of the pass band from 31.467 MHz to 40.687 MHz falls within the range from 1.5SR to 2SR, and there is no aliasing of any part of the pass-band into any other. This means that the unwanted signal can be filtered out.

Alternatively, choosing a sampling rate of 21.0 Ms/s means that the lower end of the pass-band falls below 1.5SR, as shown in FIG. 5. In this case, the lower edge of the pass-band at 31.467 MHz aliases to (1.5SR−31.467)=0.033 MHz below 0.5SR, while the lower edge of the wanted signal band, at (36.167−7.61 *½) MHz aliases to (36.167−7.61*½−1.5SR)=0.862 MHz below 0.5SR. Thus there is no interference, and the unwanted signal can be filtered out.

Choosing a sample rate of 20 Ms/s means that, as in FIG. 4, the upper end of the pass-band aliases into the output, and the unwanted signal can potentially interfere with the wanted signal. In this case, the upper edge of the wanted band at (36.167+7.61*½)=39.972 MHz aliases to 0.028 MHz, while the unwanted signal at (36.167+4.1981)= 40.3651 MHz aliases to 0.3651 MHz, which is within the wanted band. This will mean that the following condition cannot be met, for any value of Δ:

$$(N-FS2)+\Delta<(FS2-SB*½).$$

Summary

A novel method and apparatus for receiving radio frequency signals has been described, wherein the method utilizes an inventive receiver circuit that downconverts an input signal so that interference components of the input signal can be easily removed at baseband. Specifically, the inventive receiver circuit operates by sub-sampling a first intermediate frequency signal in such a way that an unwanted signal is not aliased into a wanted signal, and can therefore be filtered therefrom after sub-sampling. Thus, the present invention allows the use of a relatively simple tuner, with a single downconversion stage, without imposing excessive requirements on the filtering in the tuner. The disclosed methods and apparatus can be utilized with a number of communication systems, including, without limitation, a television communication system.

A number of embodiments have been described. Nevertheless, it will be understood that various modifications may be made without departing from the spirit and scope of the invention. For example, the present inventive method and apparatus can be implemented in software, hardware, or in a software/hardware combination. Furthermore, the present inventive method and apparatus can be used in virtually any type of communication system. Its use is not limited to a European DVB-T standard-based communication system. Alternatively, the present invention can be used in a North American television standard-based communication system. Accordingly, it is to be understood that the invention is not to be limited by the specific illustrated embodiment, but only by the scope of the appended claims.

What is claimed is:

1. A receiver adapted for use in a communication system, wherein the communication system includes at least one transmitter and at least one receiver, and wherein data is received by the receiver in a received signal having a received frequency within a received frequency band, and wherein the received signal comprises a wanted signal having a first wanted frequency within a first wanted frequency band and an interference signal having an interference frequency within the received frequency band, and wherein the first wanted frequency band is between a lower wanted frequency and an upper wanted frequency, and wherein the wanted signal is centered about a first wanted frequency band center frequency, the receiver comprising:

(a) a tuner, adapted to receive the received signal, wherein the tuner outputs a first intermediate frequency signal (IF), and wherein the IF has a first intermediate frequency signal band (SB) and is centered about a first intermediate center frequency (IF1); and (b) an analog-to-digital converter (ADC), coupled and responsive to the tuner, wherein the ADC samples and downconverts the IF and outputs a downconverted signal, and wherein the ADC has a sampling rate (SR) that is less than twice the upper wanted frequency, and wherein the sampling rate is selected so that a degree of aliasing of the interference signal into the first wanted frequency band after downconversion is maintained below a predetermined threshold.

2. The receiver as set forth in claim 1, wherein the tuner downconverts the received signal into the first intermediate frequency (IF) signal using a mixer.

3. The receiver as set forth in claim 1, wherein the tuner attenuates a plurality of extraneous signals having frequencies outside of a selected channel width (CW).

4. The receiver as set forth in claim 3, wherein the selected channel width (CW) is approximately centered at IF1 and ranges approximately between (IF1−½*CW) and (IF1+½*CW).

5. The receiver as set forth in claim 4, wherein the sampling rate (SR) of the ADC is specified so that CW is within a sampling rate range that ranges from a lower limit to an upper limit, and wherein the lower limit is approximately (k−½)*SR; and wherein the upper limit is approximately k*SR, and wherein k is an integer value.

6. The receiver as set forth in claim 5, wherein the downconverted signal comprises a reflected CW that ranges approximately between 0 and ½*SR.

7. The receiver as set forth in claim 5, wherein the IF1 is separated from the upper limit by a frequency separation (FS1), and wherein the FS1 is approximately equal to (k*SR−IF1).

8. The receiver as set forth in claim 7, wherein the downconverted signal is mixed with a complex carrier signal having a frequency that approximates FS1.

9. The receiver as set forth in claim 4, wherein the sampling rate (SR) of the ADC is specified so that k*SR falls within the channel width, and wherein the sampling rate falls outside of the first intermediate frequency signal band.

10. The receiver as set forth in claim 9, wherein the IF1 is separated from k*SR by a frequency separation (FS2), and wherein the FS2 equals approximately (k*SR−IF1).

11. The receiver as set forth in claim 10, wherein an unwanted frequency is present at (IF1+N), and wherein the receiver maintains the following condition:

$$(N-FS2)+\Delta<(FS2-SB*\tfrac{1}{2});$$

wherein Δ is an allowed frequency offset; and wherein N is IF1 subtracted from the unwanted frequency.

12. The receiver as set forth in claim 10, wherein an unwanted frequency is at (IF1+N), and wherein the receiver maintains the following condition:

$$(FS2+SB*\tfrac{1}{2})+\Delta<\tfrac{1}{2}*SR;$$

wherein Δ is an allowed frequency offset.

13. The receiver as set forth in claim 4, wherein the sampling rate (SR) is specified so that the selected CW falls within a sampling rate range between a lower limit and an upper limit, wherein the lower limit is approximately equal to k*SR, and wherein the upper limit is approximately equal to (k+½)*SR, and wherein k is an integer value.

14. The receiver as set forth in claim 13, wherein the downconverted signal comprises a reflected CW ranging between approximately 0 and ½*SR, and wherein the IF1 is separated from the upper limit by a frequency separation (FS1), and wherein the FS1 equals approximately (IF1−k*SR).

15. The receiver as set forth in claim 1, wherein the receiver further comprises a demodulator, coupled and responsive to the downconverted signal, wherein the demodulator is capable of removing a COFDM modulation from the downconverted signal and outputting a suitable output signal.

16. The receiver as set forth in claim 1, wherein the tuner comprises a first mixer coupled to a band-pass filter, wherein the first mixer is coupled to the received signal and a first local oscillator signal, and wherein the first mixer downconverts the received signal into the first intermediate frequency signal and inputs the first intermediate frequency signal to the band-pass filter.

17. The receiver as set forth in claim 16, wherein the band-pass filter attenuates a plurality of extraneous signals having frequencies that fall outside of a channel width (CW), and wherein the band-pass filter outputs the first intermediate frequency signal.

18. The receiver as set forth in claim 1, wherein the receiver further comprises a first automatic gain control (AGC) device, coupled and responsive to the first intermediate frequency and the ADC, and wherein the first AGC device maintains a signal level of the first intermediate frequency, and wherein the first AGC device outputs a maintained intermediate frequency to an input of the ADC.

19. The receiver as set forth in claim 1, wherein the receiver further comprises a filter adapted to receive the downconverted signal, wherein the filter removes unwanted components from the downconverted signal and outputs a second intermediate frequency signal having a second intermediate center frequency (IF2).

20. The receiver as set forth in claim 19, wherein the filter comprises a second mixer coupled to a low-pass filter, wherein the second mixer is coupled to the downconverted signal and a second local oscillator signal, and wherein the second local oscillator signal has a frequency approximately equal to the IF2, and wherein the second mixer downconverts the downconverted signal into the second intermediate frequency signal and outputs the second intermediate frequency signal to the low-pass filter.

21. The receiver as set forth in claim 20, wherein the band-pass filter attenuates a plurality of extraneous signals having frequencies that are above a predetermined frequency, and wherein the band-pass filter generates the second intermediate frequency signal.

22. The receiver as set forth in claim 19, wherein the receiver further includes a second automatic gain control (AGC) device, coupled to the second intermediate frequency signal, wherein the second AGC device amplifies the second intermediate frequency signal and outputs an amplified second intermediate frequency signal.

23. The receiver as set forth in claim 19, wherein the receiver further includes a demodulator, coupled to the second intermediate frequency signal, wherein the demodulator removes COFDM modulation from the second intermediate frequency signal and outputs an output signal.

24. A communication system including at least one transmitter and at least one receiver, wherein data is received by a receiver in a received signal, wherein the received signal comprises a wanted signal having a first wanted frequency in a first wanted frequency band and an interference signal having an interference frequency within a received frequency band, and wherein the first wanted frequency band ranges between a lower wanted frequency and an upper wanted frequency, the communication system comprising:
 (a) at least one transmitter; and
 (b) at least one receiver comprising:
  (1) a tuner, adapted to receive the received signal, wherein the tuner outputs a first intermediate frequency signal (IF), and wherein the IF has a first intermediate frequency signal band (SB) and is centered about a first intermediate center frequency (IF1); and
  (2) an analog-to-digital converter (ADC), coupled and responsive to the tuner, wherein the ADC samples and downconverts the IF and outputs a downconverted signal, and wherein the ADC has a sampling rate (SR) that is less than twice the upper wanted frequency, and wherein the sampling rate is selected so that a degree of aliasing of the interference signal into the first wanted frequency band after downconversion is maintained below a predetermined threshold.

25. An apparatus for receiving radio frequency signals in a communication system, wherein data is transmitted to the receiving apparatus in a received signal, wherein the received signal comprises a wanted signal having a first wanted frequency within a first wanted frequency band and an interference signal having an interference frequency within a received frequency band, and wherein the first wanted frequency band ranges between a lower wanted frequency and an upper wanted frequency, the apparatus comprising:
 (a) means for receiving the received signal and outputting a first intermediate frequency signal (IF); and
 (b) means, coupled and responsive to the receiving means, for sampling and downconverting the first intermediate frequency signal and outputting a downconverted signal, wherein the sampling and downconverting means have sampling rates that are less than twice the upper wanted frequency, and wherein the sampling rates are selected so that a degree of aliasing of the interference signal into the first wanted frequency band after downconversion is below a predetermined threshold.

26. The apparatus as set forth in claim 25, wherein the apparatus further comprises a demodulation means, coupled and responsive to the sampling and downconverting means, for removing a COFDM modulation from the downconverted signal and outputting a suitable output signal.

27. The apparatus as set forth in claim 25, wherein the receiving means further comprises a first automatic gain control (AGC) means having an input that is adapted to receive the first intermediate frequency, wherein the AGC means maintains a signal level of the first intermediate frequency and outputs a maintained intermediate frequency to an input of the sampling and downconverting means.

28. A method of receiving radio frequency signals in a communication system, wherein the communication system includes at least one transmitter and at least one receiver, and wherein data is received by the at least one receiver in a received signal, and wherein the received signal comprises a wanted signal having a first wanted frequency within a first wanted frequency band and an interference signal having an interference frequency within the received frequency band, wherein the first wanted frequency band ranges between a lower wanted frequency and an upper wanted frequency, the method comprising the steps of:

(a) converting the received signal into a first intermediate frequency signal (IF), wherein the IF has a first intermediate frequency signal band (SB) and is centered around a first intermediate center frequency (IF1); and (b) downconverting the IF at a sampling rate that is less than twice the upper wanted frequency, wherein the sampling rate is selected so that a degree of aliasing of the interference signal into the first wanted frequency band after downconversion is maintained below a predetermined threshold.

29. The method of receiving radio frequency signals as set forth in claim 28, wherein the converting step (a) comprises the sub-steps of:

(1) receiving the received signal; and (2) mixing the received signal with a local oscillator signal.

30. The method of receiving radio frequency signals as set forth in claim 28, wherein the converting step (a) comprises filtering the received signal to produce a filtered received signal, wherein the filtered received signal has a channel width (CW) that is approximately centered at IF1 and ranges between approximately (IF1−½*CW) and (IF1+½*CW).

31. The method of receiving radio frequency signals as set forth in claim 30, wherein the sampling rate is specified so that the CW falls within a sampling rate range that ranges between a lower limit and an upper limit, and wherein the lower limit is approximately (k−½)*SR, and wherein the upper limit is approximately k*SR, wherein k is an integer.

32. The method of receiving radio frequency signals as set forth in claim 30, wherein the sampling rate (SR) is specified so that k*SR falls within the channel width, and wherein the sampling rate falls outside the first intermediate frequency signal band.

33. The method of receiving radio frequency signals as set forth in claim 30, wherein the sampling rate (SR) is specified so that the CW falls within a sampling rate range that ranges between a lower limit and an upper limit, and wherein the lower limit is approximately k*SR, and wherein the upper limit is approximately (k+½)*SR, wherein k is an integer.

* * * * *